United States Patent [19]

Wells

[11] 4,319,761
[45] Mar. 16, 1982

[54] MOP BUCKET CONNECTOR

[76] Inventor: William A. Wells, 6811 Blue Pkwy., Kansas City, Mo. 64129

[21] Appl. No.: 110,908

[22] Filed: Jan. 10, 1980

[51] Int. Cl.³ .............................................. B62B 11/00
[52] U.S. Cl. .................................. 280/47.36; 15/264; 24/261 F; 220/23.4; 248/129; 294/16
[58] Field of Search .......... 280/47.36, 79.1 A, 79.1 R, 280/408, 204, 29, 79.2, 79.3; 15/264; 248/129; 224/45 C, 45 G, 45 P, 45 E; 16/111 R, 112; 220/23.4; 24/137 R, 139, 255 R, 261 R, 261 F; 294/16, 87 R, 137, 140, 158, 167, 99, 33

[56] References Cited

U.S. PATENT DOCUMENTS

| | | | |
|---|---|---|---|
| 1,460,554 | 7/1923 | Moore | 224/45 C |
| 1,746,962 | 2/1930 | Perry | 24/255 R |
| 2,312,256 | 2/1943 | Lumley | 224/45 C |
| 2,362,331 | 11/1944 | Weber | 224/45 C |
| 2,519,149 | 8/1950 | McWethy et al. | 224/45 C |
| 2,541,819 | 2/1951 | Hudson | 294/33 |
| 2,565,448 | 8/1951 | Brownell | 224/45 C |
| 3,341,242 | 9/1967 | Carson | 294/16 |
| 3,658,383 | 4/1972 | Sisson | 280/47.36 X |
| 3,726,535 | 4/1973 | Longato | 280/79.2 X |

*Primary Examiner*—Joseph F. Peters, Jr.
*Assistant Examiner*—Donald W. Underwood
*Attorney, Agent, or Firm*—John A. Hamilton

[57] ABSTRACT

A mop bucket connector comprising a clip of inverted U-shape the arms of which may be inserted downwardly respectively into a pair of wheeled mop buckets to assemble them into a unitary relationship, a spacer fixed to the clip and adapted to be disposed between the buckets, the clip arms being resiliently biased to urge the buckets against the spacer, and a handle connected to the spacer by means of which the bucket assembly may be propelled in the manner of a cart.

2 Claims, 4 Drawing Figures

U.S. Patent
Mar. 16, 1982
4,319,761
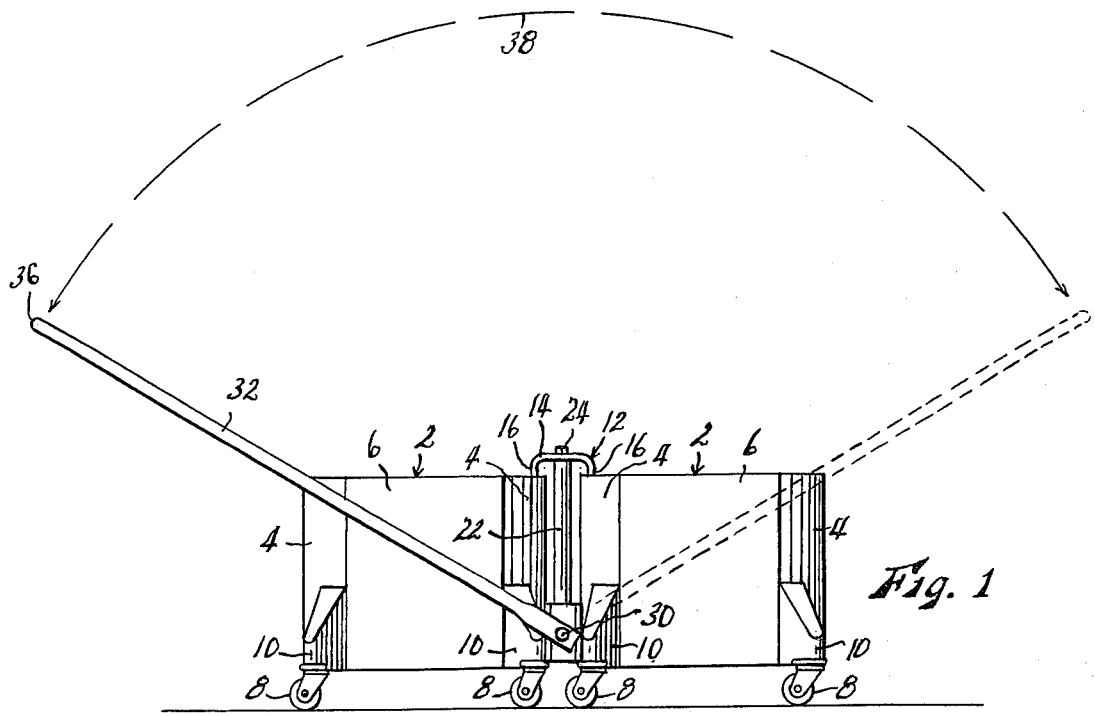
Fig. 1
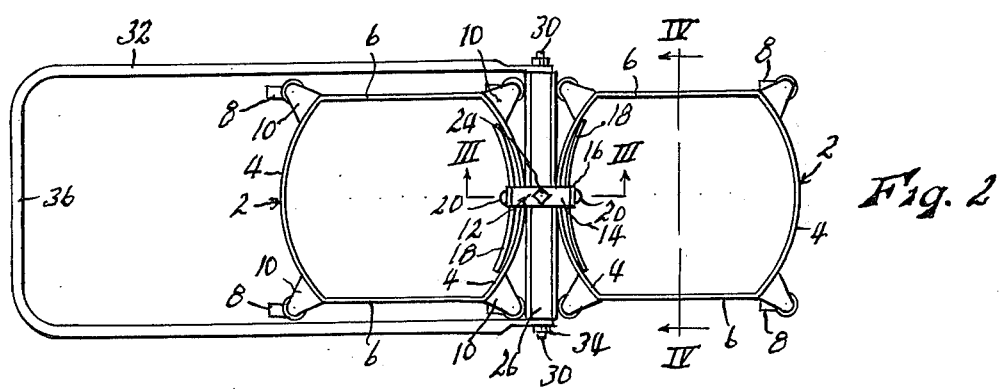
Fig. 2
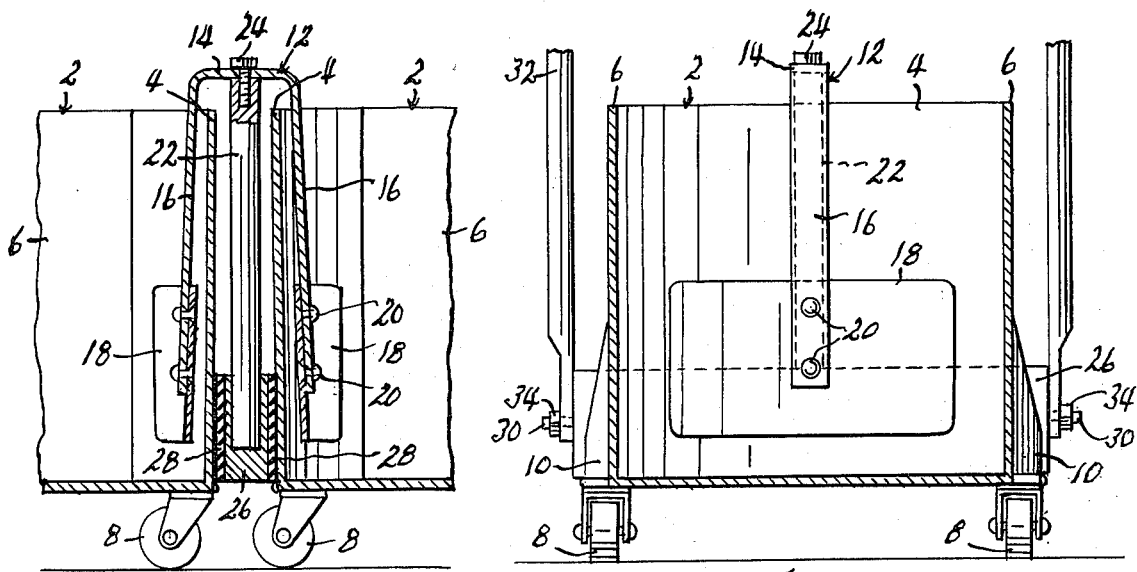
Fig. 3
Fig. 4

MOP BUCKET CONNECTOR

This invention relates to new and useful improvements in janitorial equipment, and has particular reference to a device facilitating the virtually universal use of mop buckets.

Most janitorial personnel, when mopping floors, prefer to use two buckets, one for soapy water or other cleaning compound, and one for clear rinse water. The buckets are usually provided with wheels for easier transportation from place to place, and in view of the fact that they are often sized to contain 8 to 11 gallons of water, they are quite heavy for manual carrying. But even though wheeled, wheeling them about also usually involves leaning or stooping, which is tiring to the worker, and the resulting fatigue is further multiplied if he must push two buckets about for long periods of time.

Accordingly, a principal object of the present invention is the provision of a connector operable to join a pair of mop buckets in a unitary assembly, whereby they may be wheeled about for transportation as a single bucket, thereby greatly reducing the amount of labor involved.

Another object is the provision of a mop bucket connector of the character described which is capable of holding the two buckets in firmly assembled relation despite the fact that the confronting walls of the buckets may be convexly curved, and thus have a tendency to "roll" relatively about vertical axes.

A further object is the provision of a mop bucket connector of the character described which also provides a handle by means of which the connected buckets may be wheeled about in the manner of a cart, thereby eliminating the leaning or stooping usually involved in propelling them over the floor.

To these ends, the present connector generally comprises a spring clip of inverted U-form the arms of which are adapted to be inserted downwardly respectively into a pair of adjacent buckets, a horizontal spacer bar disposed between the lower portions of the clip arms and connected to the top connector portion of the clip so as to be disposable between the buckets and to extend laterally therefrom, the clip arms being pre-stressed to urge the buckets firmly against the spacer bar, and the lower portions of the clip arms being widened to engage the bucket walls at widely laterally spaced apart areas, and a handle connected to the ends of said spacer bar and extending to such a height that the assembled buckets may be wheeled about in the manner of a cart.

Other objects are simplicity and economy of construction, and efficiency and dependability of operation.

With these objects in view, as well as other objects which will appear in the course of the specification, reference will be had to the accompanying drawing, wherein:

FIG. 1 is a side elevational view of a pair of mop buckets operably joined by a connector embodying the present invention, FIG. 2 is a top plan view of the parts as shown in FIG. 1, FIG. 3 is an enlarged, fragmentary sectional view taken on line III—III of FIG. 2, and FIG. 4 is an enlarged, fragmentary sectional view taken on line IV—IV of FIG. 2.

Like reference numerals apply to similar parts throughout the several views, and the numeral 2 applies generally to each of a pair of identical mop buckets. As shown, each of said buckets is provided with cylindrically curved vertical end walls 4 and generally planar vertical side walls 6, although the specific shape is largely optional. Each bucket is provided with four floor-engaging wheels 8 disposed respectively at the four "corners" thereof, and castered to permit easy steering thereof. To provide greater stability against overturning, the wheels may be set outwardly from the body of the bucket, being carried by bosses 10 formed integrally with the bucket, and projecting horizontally outwardly therefrom. Each bucket may also be provided with a carrying bale, not shown. The buckets described are of a common form in everyday use.

The connector forming the subject matter of the present invention includes a heavy spring clip 12 of inverted U-form, having a top connecting portion 14 and a pair of spaced apart arms 16 depending respectively from the ends of said connecting portion. The buckets are arranged in aligned relation as shown, with a pair of the curved end walls 4 thereof in confronting relation, and the arms 16 are inserted downwardly respectively into the two buckets.

A plate 18 is affixed to the lower end portion of each clip arm 16 as by rivets 20. Said plate extends laterally from its clip arm to a considerable distance, in a plane generally normal to the general plane of clip 12, although its total width must be less than that of the bucket. It is generally cylindrically curved about an axis parallel to the clip arm, with its convex face confronting the adjacent bucket end wall. For reasons which will presently appear, the curvature of the plate should be about a somewhat greater radius of curvature than that of the adjacent bucket end wall, so that said plate engages the bucket wall only at its lateral edge portions, as best shown in FIG. 2.

A vertical rigid post 22 is affixed at its upper end to the midpoint of connecting portion 14 of the clip, as by screw 24, and is affixed at its lower end in a horizontal spacer bar 26 extending normally to the plane of the clip, so as to be disposed between the two buckets. The spacer bar is of such length as to project laterally outwardly from the sides of the buckets, at both sides thereof, and its vertical side surfaces are preferably provided with thick, soft rubber facings 28, as best shown in FIG. 3. The spacer bar is disposed at such an elevation as to be disposed between the lower portions of the buckets. The arms 16 are pre-stressed toward each other to such an extent that they must be resiliently and manually spread apart to permit insertion thereof into the buckets when spacer bar 26 is disposed between the buckets.

The spacer bar is provided at its respectively opposite ends with horizontally coaxial pintles 30, on which the lower ends of a propelling handle 32, which is also of inverted U-form, are pivotally mounted, and secured by nuts 34 threaded on said pintles. The handle extends to such an elevation that its cross bar 36 may be grasped conviently by a standing person for propelling and steering the connected buckets, and it may be freely pivoted, as indicated by arc 38 in FIG. 1, to a position shown in dotted lines, for convenience in propelling the buckets in either direction.

In use, the buckets 2 are arranged as shown, and spacer bar 26 is disposed between the buckets at their top edges. Then clip arms 16 are spread resiliently, in a manual operation, sufficiently that they, together with their plates 18, may enter the buckets. The clip 12 is then pressed downwardly to slide the connector to the position shown in the drawing, with spacer bar 26 between the lower portions of the buckets. The buckets are then firmly joined in tandem in a unitary assembly, and may be wheeled about, by using handle 32, as a single bucket, in the manner of a cart. The spring force of clip arms 16 holds the buckets firmly against the spacer bar, and hence holds the buckets firmly in the positional relationship shown, and prevents relative movement therebetween.

In many cases, as presently illustrated, spacer bar 26 may have a three-point contact with each bucket, contacting the center of bucket end wall 4 at its midpoint, and contacting the corner bosses 10 of the bucket adjacent its ends. With this three-point contact, the pressure of clip arms 16 can fully stabilize the two buckets against relative movement even in the absence of plates 18, and said plates could be dispensed with. Also, any slight non-linear relation of the corner bosses with the center of the bucket end wall can be compensated for by the yieldable facings 28 of the spacer bar. The bucket stabilization would also be preserved if the bosses projected further, so as to provide only two-point contact with the spacer bar, but at its ends. However, under some circumstances, such as if the bosses extended to any markedly less degree, or if there were no bosses and the wheels were disposed beneath the body portion of the bucket, then the spacer bar would have essentially only a one-point contact with the curved end wall of the bucket, and the buckets would tend to "roll" horizontally along the spacer bar, tending to create undesirable relative movement between the buckets. Under these circumstances, plates 18 become necessary. These plates resist any such relative movement between the buckets as just described, since they then transmit a greatly magnified twisting torque to clip arms 16, which are highly resistant to torque. Thus the buckets are adequately stabilized against relative movement despite the fact that they have only one-point contact with the spacer bar. Of course, plates 18 perform this function most efficiently when they engage the bucket wall only at their extreme lateral edges, as far as possible from the clip arms, since they are thus caused to exert the maximum possible torque on the associated clip arm. It is for this reason that plates 18 are preferably curved, in order to avoid obstructing the bucket interior as much as possible, but to a greater radius than the bucket wall curvature, so as to engage the bucket wall only at their extreme lateral edge portions.

While I have shown and described a specific embodiment of my invention, it will be readily apparent that many minor changes of structure and operation could be made without departing from the spirit of the invention.

What I claim as new and desire to protect by Letters Patent is:

1. A connector for joining two wheeled mop buckets disposed in end-to-end relation firmly together whereby said buckets may be wheeled from place to place as a unitary assembly, said connector comprising:

a. a clip of inverted U-form, having a pair of depending arms adapted to be inserted downwardly respectively into the two buckets, said arms being resilient and so pre-stressed that when so inserted their resilience causes them to press said buckets firmly toward each other, b. a spacer bar disposed horizontally between said buckets when said clip is inserted as recited, said spacer bar extending normally to the general plane of said clip, this being a plane including the axis and centerlines of the arms of said clip, and between the lower end portions of said clip arms, whereby the resilience of said clip arms presses said buckets firmly against opposite sides of said spacer bar, c. means disposed between said buckets and affixing said spacer bar to the top connecting portion of said U-shaped clip, the confronting walls of said buckets being arcuately convex toward each other, and d. a plate affixed to the lower end of each of said clip arms and operable to engage the interior surface of the associated bucket wall, said plate being substantially wider than the clip arm laterally of the general plane of the clip, and curved about an axis parallel to the axis of curvature of the bucket wall but having a greater radius of curvature, whereby to engage said bucket wall only at its extreme lateral edge portions.

2. A connector for joining two wheeled mop buckets disposed in end-to-end relation firmly together whereby said buckets may be wheeled from place to place as a unitary assembly, said connector comprising:

a. a clip of inverted U-form, having a pair of depending arms adapted to be inserted downwardly respectively into the two buckets, said arms being resilient and so pre-stressed that when so inserted their resilience causes them to press said buckets firmly toward each other, b. a spacer bar disposed horizontally between said buckets when said clip is inserted as recited, said spacer bar extending normally to the general plane of said clip, this being a plane including the axis and centerlines of the arms of said clip, and between the lower end portions of said clip arms, whereby the resilience of said clip arms presses said buckets firmly against opposite sides of said spacer bar, c. means disposed between said buckets and affixing said spacer bar to the top connecting portion of said U-shaped clip, said spacer bar being of sufficient length to extend beyond the sides of said buckets, and d. a handle connected to said spacer bar and extending to a sufficient height to be usable by a standing person to propel the bucket assembly about in the manner of a cart, said handle being of inverted U-form, the lower ends thereof being connected respectively to the opposite ends of said spacer bar for pivotal movement about an axis parallel to said spacer bar.

* * * * *